No. 628,882. Patented July 11, 1899.
J. J. WERNER.
STOVEPIPE COUPLING.
(Application filed June 2, 1898.)
(No Model.)
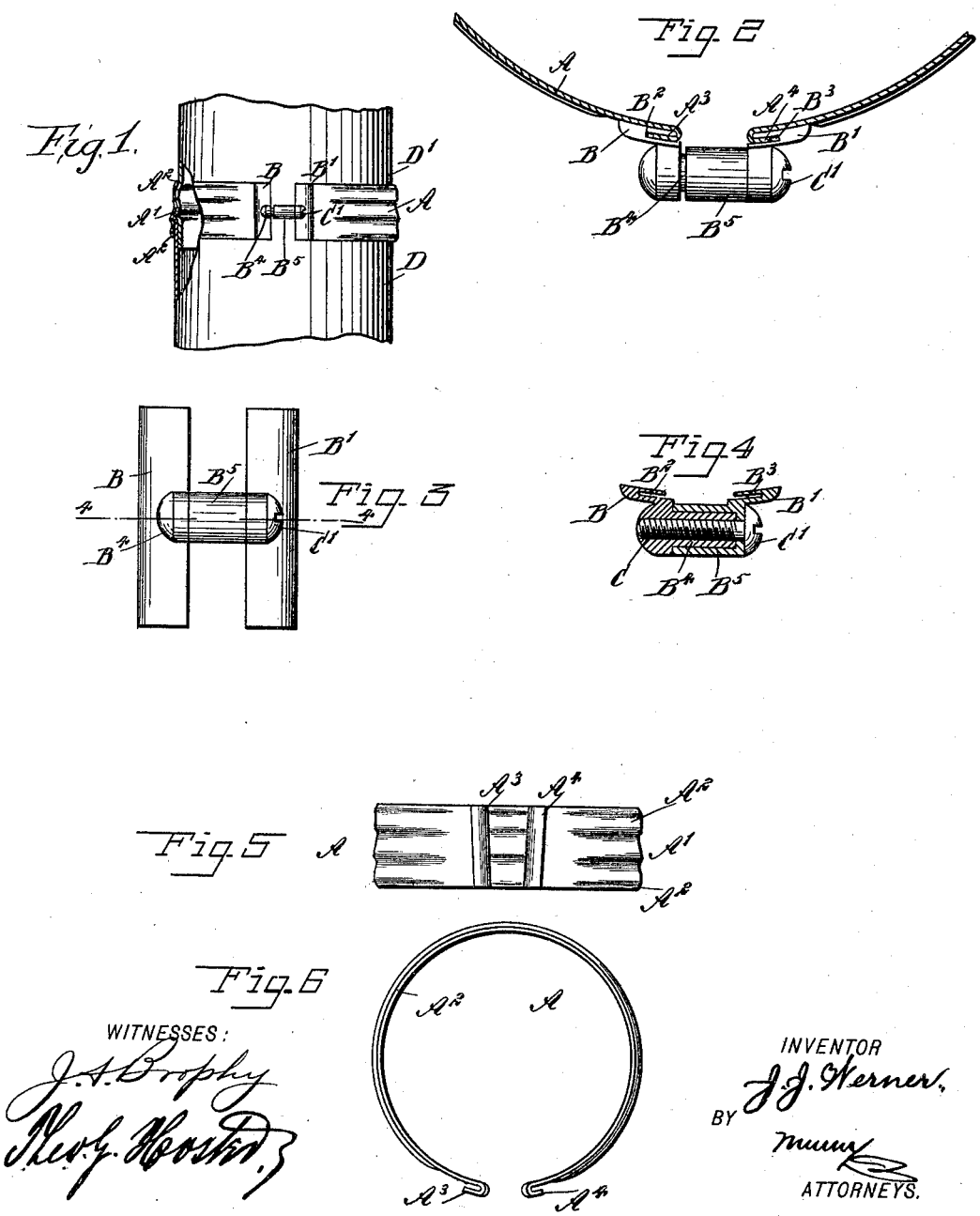

UNITED STATES PATENT OFFICE.

JACOB J. WERNER, OF HEBRON, NEBRASKA.

STOVEPIPE-COUPLING.

SPECIFICATION forming part of Letters Patent No. 628,882, dated July 11, 1899.

Application filed June 2, 1898. Serial No. 682,383. (No model.)

*To all whom it may concern:*

Be it known that I, JACOB J. WERNER, of Hebron, in the county of Thayer and State of Nebraska, have invented a new and Improved Stovepipe-Coupling, of which the following is a full, clear, and exact description.

The object of the invention is to provide a new and improved stovepipe-coupling which is simple and durable in construction and arranged to permit of conveniently, quickly and securely fastening the ends of adjacent stovepipe together to hold the pipe perfectly straight and rigid without requiring riveted joints, supporting screw-hooks, or other supports.

The invention consists of novel features and parts and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a front elevation of the improvement as applied and with parts in section. Fig. 2 is an enlarged sectional plan view of the improvement. Fig. 3 is an enlarged front elevation of the tightening device for the clamping-band of the coupling. Fig. 4 is a sectional plan view of the same on the line 4 4 in Fig. 3. Fig. 5 is a side elevation of the clamping-band. Fig. 6 is a plan view of the same.

The improved pipe-coupling is provided with a band A, swaged in its body portion $A'$, so as to show in cross-section an ogee form, the top and bottom edges $A^2$ being bent inward, as is plainly indicated in the drawings. The ends of the band A are formed with external flanges $A^3$ $A^4$, standing at a slight angle to each other, as is plainly indicated in Figs. 2 and 5, and the said flanges are fitted into corresponding grooves $B^2$ $B^3$, respectively, in the bars B B', preferably made of malleable iron and securely fastened in place on the ends of the band by hammering the bars to close them firmly onto the flanges $A^3$ and $A^4$. On the bar B is formed a longitudinally-extending pin $B^4$, formed with an internal screw-thread and fitted to slide in a tube $B^5$, secured to the other bar B'. A screw C screws in the threaded pin $B^4$ and is adapted to abut with its head C' against the outer end of the tube $B^5$, so that by turning the screw the diameter of the band A can be increased or decreased, so as to first loosely place the band onto the ends of the pipe-sections D D', as is plainly indicated in Fig. 1, and then by screwing up the screw C the ends of the band A are drawn tightly together to securely clamp the band on the jointed pipe-sections. In doing so the swaged body portion $A'$ of the clamping-band A fits on a corresponding swage on the small end of the pipe-section, and the bent edges $A^2$ of the clamping-band fit snugly upon the pipe to prevent any escape of the smoke or gases from the joint between the two sections.

By having the flanges $A^3$ and $A^4$ standing slightly at an angle to each other sufficient flare is given to the band to bind tightly on the large and small end of the pipe-sections D and D'. (See Fig. 1.)

It is evident that by having the connection between the ends of the band A adjustable, as described, the band will readily compensate for pipe-sections of slightly larger or smaller diameter.

Having thus fully described my invention, I claim as new and desire to secure by Letters Patent—

1. A stovepipe-coupling provided with a band, and a fastener for the ends of the band, and comprising two members secured to the band ends, one member being provided with a tube for receiving a threaded pin on the other member, and a screw screwing in said threaded pin, the head of which abuts against the outer end of the tube, substantially as shown and described.

2. A stovepipe-coupling, comprising a band having its ends formed with outer flanges, fastener-bars having slots for receiving the said flanges, a tube on one of the bars, an internally-threaded pin on the other bar and fitted to slide in the said tube, and a screw screwing in said pin, its head being adapted to abut against the outer end of the tube, substantially as shown and described.

JACOB J. WERNER.

Witnesses:
BYRON F. YOUNG,
B. W. HESS.